United States Patent [19]
Bayerle et al.

[11] Patent Number: 5,921,077
[45] Date of Patent: Jul. 13, 1999

[54] METHOD OF MONITORING A SECONDARY AIR PUMP

[75] Inventors: Klaus Bayerle, Regensburg; Anton Angermaier, Thann, both of Germany

[73] Assignee: Siemens Aktiengesellschaft, Munich, Germany

[21] Appl. No.: 08/883,034

[22] Filed: Jun. 26, 1997

Related U.S. Application Data

[63] Continuation of application No. PCT/DE96/01918, Oct. 8, 1996.

[30] Foreign Application Priority Data

Oct. 26, 1995 [DE] Germany .......................... 195 39 938

[51] Int. Cl.$^6$ ...................................................... F01N 3/00
[52] U.S. Cl. ................................ 60/274; 60/287; 60/289; 60/290; 60/307
[58] Field of Search .............................. 60/287, 374, 289, 60/290, 307

[56] References Cited

U.S. PATENT DOCUMENTS

| | | |
|---|---|---|
| 5,060,474 | 10/1991 | Aramaki ................................. 60/290 |
| 5,381,658 | 1/1995 | Meguro . |
| 5,526,642 | 6/1996 | Dambach et al. ........................ 60/289 |
| 5,560,199 | 10/1996 | Agustin et al. ........................... 60/274 |
| 5,615,552 | 4/1997 | Shimasaki et al. ....................... 60/289 |

FOREIGN PATENT DOCUMENTS

| | | |
|---|---|---|
| 0663516A2 | 7/1995 | European Pat. Off. . |
| 4120891A1 | 1/1993 | Germany . |
| 4237215A1 | 5/1994 | Germany . |

OTHER PUBLICATIONS

Japanese Patent Abstracts No. 6129244 (Motokatsu et al.), dated May 10, 1994.

*Primary Examiner*—Thomas E. Denion
*Attorney, Agent, or Firm*—Herbert L. Lerner; Laurence A. Greenberg

[57] ABSTRACT

A secondary air pump communicates through an air duct with an exhaust gas line of an internal combustion engine. A catalytic converter for cleaning exhaust gas is connected in the exhaust gas line. The secondary air mass pumped by the secondary air pump is measured with an air flow rate meter. A control unit compares the measured secondary air mass with the desired secondary air mass set by the control unit. If the measured secondary air mass differs from the set secondary air mass by more than a specified amount, then the control unit has detected a malfunction.

10 Claims, 1 Drawing Sheet

METHOD OF MONITORING A SECONDARY AIR PUMP

CROSS-REFERENCE TO RELATED APPLICATION

This is a continuation of copending international application PCT/DE96/01918, filed Oct. 8, 1996, which designated the United States.

BACKGROUND OF THE INVENTION

1. Field of the Invention

The invention pertains to secondary air pumps in internal combustion engines. More specifically, the invention relates to a method of monitoring a secondary air pump, which communicates through an air duct with an exhaust gas line of an internal combustion engine to which a catalytic converter is connected, wherein the pumping capacity of the secondary air pump is predetermined, the actual pumping capacity of the secondary air pump is measured, and the measured pumping capacity is compared with the specified pumping capacity.

2. Description of the Related Art

There has become known heretofore from German patent disclosure DE 41 20 891 A1 a method of monitoring a secondary air pump, in which a desired capacity of the secondary air pump is monitored with a pressure sensor. Remedial steps are taken if the desired capacity deviates from a predetermined actual capacity. Ascertaining the actual capacity with a pressure sensor, however, is relatively imprecise. Moreover, nothing is found out about the type of malfunction.

SUMMARY OF THE INVENTION

It is accordingly an object of the invention to provide a method of monitoring a secondary air pump, which overcomes the above-mentioned disadvantages of the heretofore-known devices and methods of this general type and which allows precise and reliable monitoring of the injection of secondary air into the internal combustion engine.

With the foregoing and other objects in view there is provided, in accordance with the invention, a method of monitoring secondary air injection in an internal combustion engine, wherein a secondary air pump communicates through an air duct with an exhaust gas line of the internal combustion engine and wherein a catalytic converter for cleaning exhaust gas is connected in the exhaust gas line. The novel method comprises:

measuring at least one of an exhaust gas pressure in an exhaust gas line and an intake air of the internal combustion engine;

selecting a desired pumping capacity of a secondary air pump in dependence on one of the exhaust gas pressure and the intake air of the internal combustion engine, measuring an actual pumping capacity of the secondary air pump, and comparing the measured pumping capacity with the desired pumping capacity; and determining that a leak is present in an air duct leading from the secondary air pump to the exhaust gas line if the actual pumping capacity deviates from the desired pumping capacity by more than an acceptable deviation.

In accordance with an added feature of the invention, the selecting step comprises defining the desired pumping capacity in dependence on the exhaust gas pressure in the exhaust gas line, and/or in dependence on an engine air mass aspirated by the internal combustion engine.

In accordance with an additional feature of the invention, an air flow is measured with an air mass meter in the air duct between the secondary air pump and the exhaust gas line, and the determining step comprises determining that a leak is present in the air duct upstream of the air mass meter if the secondary air pump pumps less secondary air mass than is required on the basis of one of the engine air mass and the exhaust gas pressure.

In accordance with another feature of the invention, the method further comprises measuring an air flow with an air mass meter in the air duct between the secondary air pump and the exhaust gas line, and wherein the determining step comprises determining that a leak is present in the air duct downstream of the air flow rate meter if the secondary air pump pumps more secondary air mass than is permissible on the basis of one of the engine air mass and the exhaust gas pressure.

In accordance with again another feature of the invention, the comparing step comprises comparing the actual pumping capacity with a permissible range of the desired pumping capacity, and indicating a malfunction if the actual pumping capacity deviates outside the permissible range.

In accordance with yet another feature of the invention the comparison is performed under quasi-steady operating states of the internal combustion engine.

In accordance with again an additional feature of the invention, the comparison is repeated at fixed time intervals.

Additionally, if a non-steady operating state of the engine is detected, no comparisons are made for a specified period of time.

Finally, a malfunction is indicated if a number of comparisons carried out in the comparing step lies above a specified number and if the number of comparisons which indicate an impermissible pumping capacity exceeds a specified portion of the number of comparisons carried out in the comparing step.

Other features which are considered as characteristic for the invention are set forth in the appended claims.

Although the invention is illustrated and described herein as embodied in a method of monitoring a secondary air pump, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
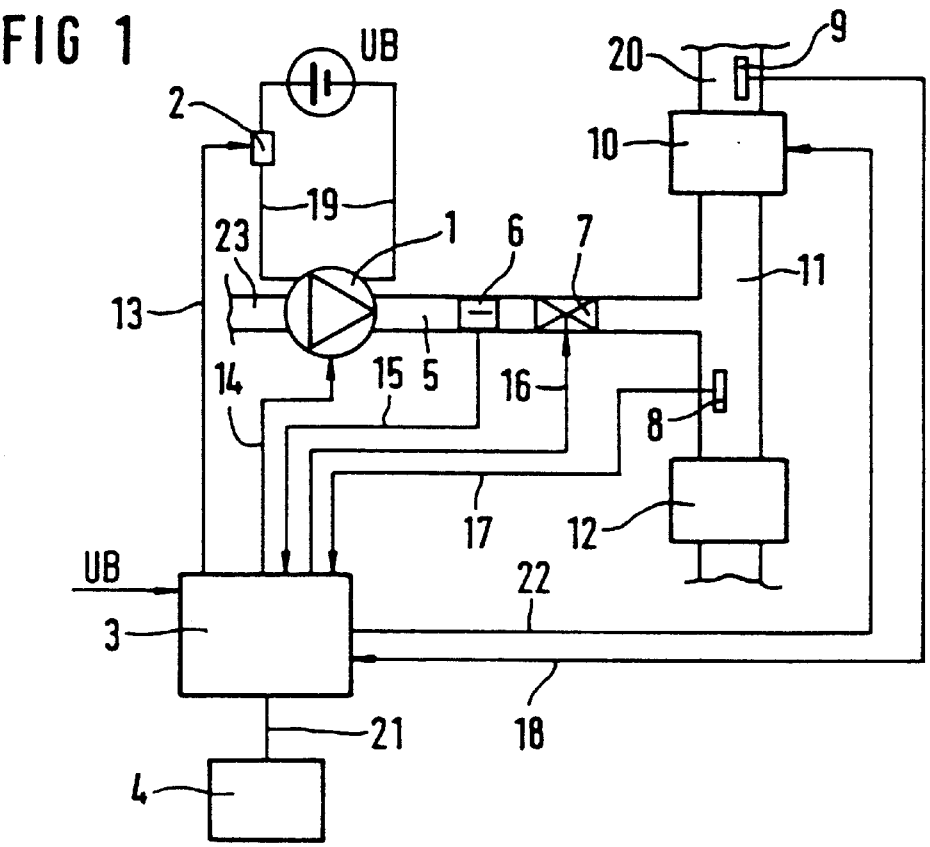
FIG. 1 is a schematic view of a configuration for performing the method.

Referring now to the figures of the drawing in detail and first, particularly, to FIG. 1 thereof, there is seen a secondary air pump 1, which communicates with an exhaust gas line 11 of an internal combustion engine 10 through an air duct 5 which issues into the exhaust gas line 11 just downstream of the internal combustion engine 10, and just upstream of a catalytic converter 12 for cleaning the exhaust gas. The secondary air pump 1 is connected to a supply voltage UB by voltage lines 19 via the relay 2 and to a control unit 3 via a first control line 14. The control unit 3 is further connected to the relay 2 via a second control line 13, to a memory 4 via a data line 21, and to the engine 10, in particular the injection system of the engine 10, via a data and control line 22. The supply voltage UB is also delivered to one input of the control unit 3.

An air flow rate meter 6 is disposed in the air duct 5 which is connected to the control unit 3 via a first measurement signal line 15. Between the air flow rate meter 6 and the exhaust gas line 11 there is disposed a valve 7 in the air duct 5. The valve 7 communicates with the control unit 3 via a valve control line 16. An engine air flow rate sensor 9 (air mass meter) is disposed in the intake region 20 of the engine 10. The sensor 9 is connected to the control unit 3 via a third measurement line 18.

An exhaust gas pressure sensor 8 is mounted in the exhaust gas line 11 between the engine 10 and the catalytic converter 12. The sensor 8 is connected to the control unit 3 via a second measurement line 17.

The system of FIG. 1 operates as follows: In a most simple embodiment of the invention, the secondary air pump 1 is embodied such that the secondary air pump 1 is operated at a constant rpm and is turned on or off by the control unit 3 via the second control line 13. The valve 7, in the simple embodiment, is thus an ON/OFF valve, with which the control unit 3 can open or close the air duct 5.

In a further embodiment of the invention, the speed (rpm) of the secondary air pump 1 is adjustable via the first control line 14. The control unit 3 controls the secondary air pump 1 as a function of the engine air mass, or flow rate, as ascertained by the engine air flow rate meter 9, or as a function of the exhaust gas pressure of the exhaust gas line, which is ascertained by the pressure sensor 8, and as a function of other operating parameters, such as the injection quantity and a desired value for the exhaust gas ratio of oxygen to fuel. To that end, the control unit 3 accesses performance graphs stored in the memory 4.

For the pumping capacity of the secondary air pump 1, or in other words for the secondary air mass per unit of time, a pumping performance graph is stored in the memory 4 that indicates the pumping capacity as a function of the supply pressure and the exhaust gas pressure, or as a function of the supply voltage and the engine air mass. The pumping performance graph is stored as a map, in which permissible deviations in the pumping capacity toward greater and lesser pumping capacities are plotted for the various operating points, which are within the standard deviation of the pumping capacity of the secondary air pumps. These values are indicated for instance by the manufacturer of the secondary air pump.

Another form of the pumping performance graph is for one maximum and one minimum performance graph to be stored in memory for the pumping capacity as a function of the supply voltage and the exhaust gas pressure or of the supply voltage and the engine air mass. In other words, these graphs indicate a maximum and minimum permissible pumping capacity, respectively, for the secondary air pump.

For the purpose of monitoring the proper functioning of the secondary air pump 1, the air flow rate meter 6 supplies the measured air mass per unit of time to the control unit 3. The control unit 3 compares the measured pumping capacity with the pumping capacity stored in the pumping performance graph, a capacity that the secondary air pump 1 in accordance with its control by the control unit 3 and the voltage applied to the secondary air pump 1 as well as the prevailing exhaust gas pressure ought to be pumping.

If the pumping capacity deviates from the pumping performance graph more than by a permissible deviation, or if the pumping capacity is outside the pumping capacity range specified by the minimum and maximum performance graphs, then a malfunction is indicated.

The measured pumping capacity is compared with the pumping performance graph in quasi-steady-state load and rpm ranges of the engine 10. Quasi-steady-state load and rpm ranges are detected if the change in the load or rpm over time does not exceed predetermined values.

One simple measuring method comprises performing the step of monitoring the pumping capacity at predetermined time intervals, and in particular every 500 msec. However, system is monitored only in quasi-steady-state load and rpm ranges. If the control unit 3 finds that a non-steady or in other words a non-quasi-steady-state operating state is present, then the next monitoring step is not performed again until after a predetermined length of time, such as after 1 second.

One type of evaluating the monitoring comprises counting the number of times monitoring is done for the length of operation of the secondary air pump, and also counting the number of times monitoring is done that shows a malfunction of the secondary air pump, and detecting a malfunction whenever the number of malfunctions is greater than 20% of the number of monitoring operations, as long as the number of monitoring operations exceeds a minimum number of 100.

Precise evaluation of the malfunction is achieved if a first counter is incremented upward if the permissible pumping capacity is exceeded and a second counter is incremented upward if the permissible pumping capacity is undershot. To detect an excessive pumping capacity or an overly low pumping capacity, the first counter and the second counter are compared with the total number of monitoring operations performed, and an overly great or overly low pumping capacity is detected whenever the first or second counter, as applicable, exceeds a predetermined number, for instance 20%, of monitoring operations performed.

By monitoring the secondary air pump 1, leaks in the air duct 5 are also detected. For example, if monitoring the secondary air pump 1 shows that the secondary air pump 1 is pumping more secondary air mass than is permissible on the basis of the engine air mass or the exhaust gas pressure, then it is safe to assume that there is a leak in the air duct 5 downstream of the air flow rate meter 6.

If the secondary air pump 1 is found to pump less air mass than has been set by the control unit 3, it is safe to assume that a malfunction of the secondary air pump 1 is indicated, or a plugged air duct 5, or a leak upstream of the air flow rate meter 6.

A preferred embodiment comprises disposing the air flow rate meter 6 upstream of the secondary air pump 1 in the intake region 23. This offers the advantage that the air flow rate meter 6 is not exposed to any pressure fluctuations and is not soiled by oil or fuel.

Figure 2:
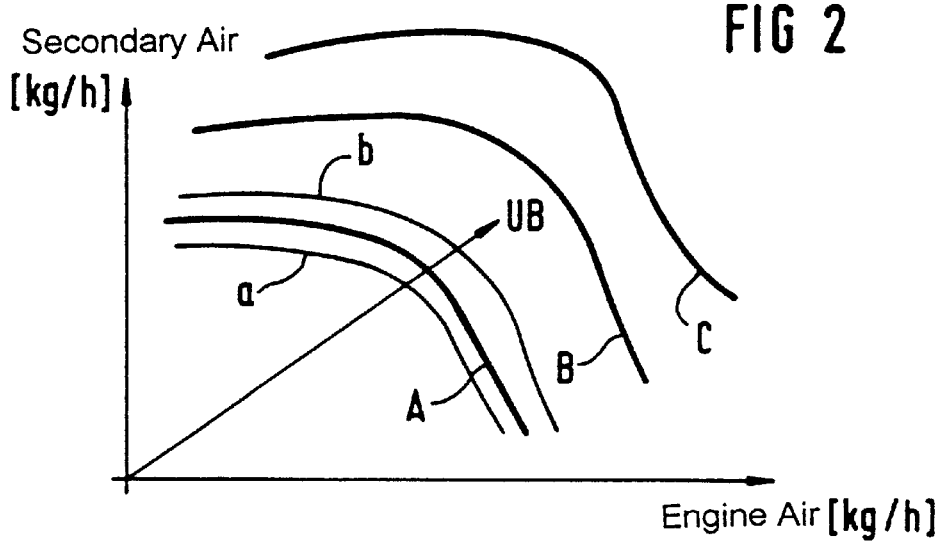
FIG. 2 is a graph of a characteristic curve for the secondary air mass.

FIG. 2 shows a pumping performance graph that plots the pumping capacity as a function of the supply voltage UB and the engine air mass, which is a function of the exhaust gas pressure. For the sake of simplicity in the drawing, FIG. 2 explicitly shows only three characteristic curves A, B, C, which correspond to three different, constant supply voltages UB. Curve A shows the secondary air as a function of the engine air mass for a voltage of 11 V, and curve B shows the secondary air for a voltage of 12 V. Shown above and below curve A are a first characteristic tolerance curve b and a second characteristic tolerance curve a, which indicate the range of pumping capacity within which the pumping capacity is found to be proper. The first and second characteristic tolerance curves a, b are shown for the supply voltage of 11 V corresponding to the characteristic curve A.

We claim:

1. A method of monitoring secondary air injection in an internal combustion engine, wherein a secondary air pump communicates through an air duct with an exhaust gas line of the internal combustion engine and wherein a catalytic converter for cleaning exhaust gas is connected in the exhaust gas line, the method which comprises:

measuring at least one of an exhaust gas pressure in the exhaust gas line and an intake engine air mass aspirated by the internal combustion engine;

selecting a desired pumping capacity of the secondary air pump in dependence on one of the exhaust gas pressure and the intake engine air mass of the internal combustion engine, measuring an actual pumping capacity of the secondary air pump, and comparing the actual pumping capacity with the desired pumping capacity;

measuring an air flow with an air mass meter in the air duct between the secondary air pump and the exhaust gas line; and determining that a leak is present in the air duct leading from the secondary air pump to the exhaust gas line if the actual pumping capacity deviates from the desired pumping capacity by more than an acceptable deviation.

2. The method according to claim 1, wherein the selecting step comprises defining the desired pumping capacity in dependence on the exhaust gas pressure in the exhaust gas line.

3. The method according to claim 1, wherein the selecting step comprises defining the desired pumping capacity in dependence on the intake engine air mass aspirated by the internal combustion engine.

4. The method according to claim 1, wherein the determining step comprises determining that a leak is present in the air duct upstream of the air mass meter if the secondary air pump pumps less secondary air mass than is required on the basis of one of the intake engine air mass and the exhaust gas pressure.

5. The method according to claim 1, wherein the determining step comprises determining that a leak is present in the air duct downstream of the air flow rate meter if the secondary air pump pumps more secondary air mass than is permissible on the basis of one of the intake engine air mass and the exhaust gas pressure.

6. The method according to claim 1, wherein the comparing step comprises comparing the actual pumping capacity with a permissible range of the desired pumping capacity, and indicating a malfunction if the actual pumping capacity deviates outside the permissible range.

7. The method according to claim 1, wherein the comparing step is performed under quasi-steady operating states of the internal combustion engine.

8. The method according to claim 1, wherein the comparing step is repeated at fixed time intervals.

9. The method according to claim 1, which comprises, if a non-steady operating state of the engine is detected, not performing the comparing step for a specified period of time.

10. The method according to claim 1, which comprises indicating a malfunction if a number of comparisons carried out in the comparing step lies above a specified number and if the number of comparisons which indicate an impermissible pumping capacity exceeds a specified portion of the number of comparisons carried out in the comparing step.

* * * * *